(12) United States Patent
Bass et al.

(10) Patent No.: US 8,211,195 B2
(45) Date of Patent: Jul. 3, 2012

(54) HOT GAS FILTRATION FABRICS WITH SILICA AND FLAME RESISTANT FIBERS

(75) Inventors: Derek S. Bass, Adairsville, GA (US); Matthew Stanley Rich, Ringgold, GA (US); Andries Don Sebastian, Ringgold, GA (US); William M. Edwards, York, SC (US)

(73) Assignee: Propex Inc., Dalton, GA (US)

( * ) Notice: Subject to any disclaimer, the term of this patent is extended or adjusted under 35 U.S.C. 154(b) by 602 days.

(21) Appl. No.: 12/302,737

(22) PCT Filed: May 25, 2007

(86) PCT No.: PCT/US2007/069744
§ 371 (c)(1),
(2), (4) Date: Aug. 18, 2009

(87) PCT Pub. No.: WO2007/140302
PCT Pub. Date: Dec. 6, 2007

(65) Prior Publication Data
US 2009/0301304 A1 Dec. 10, 2009

Related U.S. Application Data

(60) Provisional application No. 60/808,747, filed on May 26, 2006.

(51) Int. Cl.
*B01D 46/02* (2006.01)
(52) U.S. Cl. ............. 55/361; 55/527; 55/528; 55/523
(58) Field of Classification Search ............ 55/361–382, 55/522–528, 341.1–341.7; 95/273–287; 210/483–510.1; 442/327–417; 96/427
See application file for complete search history.

(56) References Cited

U.S. PATENT DOCUMENTS

| 4,243,715 | A | * | 1/1981 | Gordon ..................... 442/71 |
| 4,536,439 | A | | 8/1985 | Forsten |
| 5,567,231 | A | * | 10/1996 | Yokoo et al. ................ 96/153 |
| 6,336,948 | B1 | * | 1/2002 | Inoue et al. ................ 55/486 |
| 632,766 | A1 | | 12/2009 | Erb, Jr. et al. |
| 7,878,301 | B2 | * | 2/2011 | Gross et al. ................ 181/290 |
| 2002/0046650 | A1 | * | 4/2002 | Reinelt et al. .............. 92/169.1 |
| 2003/0084788 | A1 | | 5/2003 | Fraser, Jr. |

(Continued)

FOREIGN PATENT DOCUMENTS

CN 1411888 A 4/2003
(Continued)

OTHER PUBLICATIONS

International Search Report, PCT/US2005/043173, Sep. 5, 2007, United States Patent and Trademark Office.
(Continued)

*Primary Examiner* — Duane Smith
*Assistant Examiner* — Thomas McKenzie
(74) *Attorney, Agent, or Firm* — Husch Blackwell LLP (57) ABSTRACT

Hot gas filtration fabrics for bag filters can be made using fibers that include high silica fibers and at least one FR fiber. The fabrics can be made using these fibers by needling and/or water jet entanglement. The fabrics may be treated with binders with or without additives to enhance mechanical properties or to impart other characteristics such as gas adsorption. Certain non-woven fabrics made according to the invention have improved high temperatures filtration capabilities and mechanical properties.

13 Claims, 4 Drawing Sheets

U.S. PATENT DOCUMENTS

| | | | |
|---|---|---|---|
| 2004/0097156 A1* | 5/2004 | McGuire et al. | 442/361 |
| 2004/0142620 A1* | 7/2004 | Kinsley, Jr. | 442/377 |
| 2004/0198125 A1 | 10/2004 | Mater et al. | |
| 2006/0008643 A1 | 1/2006 | Lin et al. | |
| 2006/0116043 A1* | 6/2006 | Hope et al. | 442/301 |

FOREIGN PATENT DOCUMENTS

| | | |
|---|---|---|
| JP | 2001262453 | 9/2001 |
| JP | 2002316009 | 10/2002 |
| RU | 2165393 C1 * | 4/2001 |
| WO | WO 2007/061423 | 5/2007 |
| WO | WO 2007/140302 | 12/2007 |

OTHER PUBLICATIONS

International Search Report, PCT/US2007/069744, Dec. 6, 2007, United States Patent and Trademark Office.

Q Fiber Product Brochure 2002 (online) Johns Manville Nov. 2002, retrieved Oct. 15, 2007, pp. 1-2; http//:www.jm.com/insulation/performance materials/products/hp1/26 qfiber amorphus.pdf.

Heat Shield Data Sheet (online) AFCO, 2001, retrieved Oct. 15, 2007, pp. 1-2: http://www.affco.com/heatshield.html.

* cited by examiner

HOT GAS FILTRATION FABRICS WITH SILICA AND FLAME RESISTANT FIBERS

STATEMENT REGARDING RELATED PATENT APPLICATIONS

This application is a National Stage patent application filed under 35 U.S.C. §371 of International Patent Application No. PCT/US2007/069744, filed May 25, 2007, which designated the United States of America, and which claims priority to U.S. Provisional Patent Application No. 60/808,747, filed May 26, 2006. This application is also related to PCT Patent Application No. PCT/US2005/043173, filed Nov. 30, 2005. The disclosure of each of the above-identified related applications is hereby fully incorporated herein by reference.

FIELD OF THE INVENTION

The invention generally relates to filters. More specifically, the invention relates to non-woven filters that are flame resistant and that can be manufactured from a blend of fibers comprising amorphous silica fibers and at least one flame resistant (FR) fiber.

BACKGROUND OF THE INVENTION

Filtration of fluids such as gases is often performed to remove particulate or disparate impurities from the gas stream in order to limit harmful emission of the impurities into the environment, or circulation back into the associated process. It is ordinarily desirable to maximize the surface area available for filtration so as to remove large amounts of undesirable contaminants from the fluid stream, while maintaining the operating pressure differential induced by the filter as low as possible to achieve long service life and minimize surface strain.

In one form of filtration that is typically referred to as interception the filter media functions in the nature of a sieve that mechanically entraps particles larger than the pore size inherent to the media. Larger particles are removed from the fluid stream by the openings in the filter media, with particles building on top of one another to create a filter cake that removes successively smaller particles.

More specifically, in a so-called "baghouse filter", particulate material is removed from a gaseous stream as the stream is directed through the filter media. In a typical application, the filter media has a generally sleeve-like tubular configuration, with gas flow arranged so as to deposit the particles being filtered on the exterior of the sleeve. In this type of application, the filter media is periodically cleaned by subjecting the media to a pulsed reverse-flow, which acts to dislodge the filtered particulate material from the exterior of the sleeve for collection in the lower portion of the baghouse filter structure. U.S. Pat. No. 4,983,434, hereby incorporated by reference, illustrates a baghouse filter structure and a prior art filter laminate.

The most commonly used fibers for hot gas filtration are polyethylene terephthalate (PET), acrylics, meta-aramids, polyimides, polyphenylene sulphide, and glass, which are normally used as fiber mixtures. U.S. Pat. No. 4,295,868 describes a silicic acid glass fiber-based fabric coated with metal oxides to improve fiber strength. The patent mentions that glass fibers containing 95% or more $SiO_2$ are considered to be too brittle to be used as filters. WO 86/00570 describes a layered filter fabric containing a separate glass layer and one or more organic fiber layers. The glass fiber used could be made out of C-glass, E-glass, or S-Glass. WO 87/01655 describes a filter medium containing a layer of high temperature fibers such as glass, attached to a fabric made of high temperature fiber such as glass, so as to achieve good flex resistance. The following patent documents describe use of glass fibers without defining the type of glass used in making the fibers: U.S. Pat. No. 5,713,972, U.S. Pat. No. 6,340,379, WO 03/095067, WO 99/47236, U.S. Pat. Applications 2002/0023874, 2002/0023419, 2003/0101866, 2004/0163540.

Several patents describe attempts to increase the pollutant adsorption capacity of fibers either by inclusion of absorbants such as activated carbon, zeolites or making the fiber itself porous. Thus, U.S. Pat. Application 2004/0163540, and WO 03/090900, describe use of activated carbon or zeolites, while U.S. Pat. Application 2004/0197552 describes making silica fiber based fabric and treating with a mineral mixture to generate pores on the fiber surface.

Fabrics with improved high temperature filtration capabilities and mechanical properties are needed.

BRIEF SUMMARY OF THE INVENTION

It has surprisingly been discovered that silica fibers can be blended with conventional fibers used in bag house filters, using non-woven fabrication techniques, to produce improved filter fabrics with increase heat resistance, and lower cost in many instances. Based on these discoveries, in one exemplary embodiment, the invention can provide a non-woven filter media, or a baghouse filter made from the filter media, that comprises silica fibers. The filter media can be preferably manufactured using conventional needle punch technology, and is preferably reinforced through the use of an inner, woven scrim. The non-woven fabric can be flame resistant and it can be manufactured from a blend of fibers comprising amorphous silica fibers; and at least one fiber consisting of a flame resistant (FR) fiber.

The non-woven fabric may have (1) a sufficient mechanical strength to withstand pressures developed during use and multiple cycles of flexing, (2) a resistance toward harsh chemicals for long periods of time, (3) an ability to be unaffected by continuous operating temperatures as high as 482° C. (900° F.), (4) a resistance toward hot sparks, (5) less than about 1% shrinkage at use temperature, (6) a high filtration efficiency, and (7) a resistance to being attacked by microorganisms.

The non-woven fabric can comprise from about 20 to about 80 wt. % of silica fibers, and from about 20 to about 80 wt. % of one or more FR fibers selected from modacrylics, polyester with phosphalane, melamines, meta aramids, para aramids, polybenzimidazole, polyimides, polyamideimides, partially oxidized polyacrylonitriles, novoloids, poly(p phenylene benzobisoxazoles), poly(p phenylenebenzothiazoles), polyphenylene sulfides, flame retardant viscose rayons; viscose rayon containing aluminosilicate-modified silica, cellulosics, polyetheretherketones, polyketones, polyetherimides, natural or synthetic fibers coated with an FR resin, or mixtures thereof.

Other exemplary embodiments of the invention pertain to the use of these fabrics/filters in highly demanding industrial filtering applications, including, but not limited to, pulse jet and reverse jet filtration systems used in the asphalt, cement, industrial boiler and furnace, power generation, and waste incineration markets. Therefore, in still another exemplary embodiment the invention provides a method of filtering particles from fluid comprising: (a) providing a filter that comprises silica fibers; and (b) flowing the fluid through the filter under negative or positive pressure so that the particles become blocked or stopped by the fabric made by the silica fibers.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrates several exemplary embodiments of the invention and together with the description, serves to explain the principles of the invention.

DETAILED DESCRIPTION OF THE INVENTION

The fabrics of the invention are made by using silica fibers having a high content of silica and preferably at least flame retardant/resistant (FR) thermoplastic polymeric fiber (FR fiber), each as defined below.

Flame resistance is defined by ASTM as "the property of a material whereby flaming combustion is prevented, terminated, or inhibited following application of a flaming or non-flaming source of ignition, with or without the subsequent removal of the ignition source." The material that is flame resistant may be a polymer, fiber, or fabric. A flame retardant is defined by ASTM as "a chemical used to impart flame resistance."

The weight percent of silica fiber in the non-woven material of the invention suitably is at least about 5, 10, 20, 30 or 40 wt. %, and less than about 95, 90, 80, 70 or 60 wt. % of the material. Similarly, the weight percent of FR fiber in the material suitably is at least about 5, 10, 20, 30 or 40 wt. %, and less than about 95, 90, 80, 70 or 60 wt. % of the material. In preferred, yet exemplary embodiments, the material comprises:

from about 20 to about 70 wt. % silica fiber and from about 30 to about 80 wt. % FR fiber;

from about 30 to about 65 wt. % silica fiber and from about 35 to about 70 wt. % FR fiber; or from about 40 to about 60 wt. % silica fiber and from about 40 to about 60 wt. % FR fiber.

According to one exemplary embodiment, the non-woven filter media can comprise from about 5 to about 95 wt. % of silica fibers, and from about 5 to about 95 wt. % of one or more FR fibers. Further, according to another exemplary embodiment, the non-woven filter media can further comprise two peripheral layers and an inner layer, wherein the inner layer comprises a scrim, and the peripheral layers comprise uniformly blended silica fibers and FR fibers.

According to another exemplary embodiment, the non-woven filter media can comprise from about 20 to about 80 wt. % of silica fibers, and from about 20 to about 80 wt. % of one or more FR fibers selected from modacrylics, polyester with phosphalane, melamines, meta aramids, para aramids, polybenzimidazole, polyimides, polyamideimides, partially oxidized polyacrylonitriles, novoloids, poly(p phenylene benzobisoxazoles), poly(p phenylenebenzothiazoles), polyphenylene sulfides, flame retardant viscose rayons; viscose rayon containing aluminosilicate-modified silica, cellulosics, polyetheretherketones, polyketones, polyetherimides, natural or synthetic fibers coated with an FR resin, or mixtures thereof.

According to another exemplary embodiment, the non-woven filter media is manufactured from a blend of fibers comprising amorphous silica fibers and flame resistant (FR) fibers. The blend can comprise from about 5 to about 65 weight percent amorphous silica fibers and from about 35 to about 95 weight percent of one or more FR fibers.

In a particularly preferred exemplary embodiment, the fabric is produced in a needle punching operation from a plurality of carded stacks of fiber. Each carded stack may contain only one particular fiber, or a particular blend of fibers, but in a preferred exemplary embodiment each carded stack contains all of the fibers in the material uniformly blended in each carded stack. In one exemplary embodiment, there are at least two stacks of fiber separated by a woven scrim, which becomes bound to the stacks in the needle punching operation. The woven scrim can be any made of any material that can withstand the physical demands required of the material, such as fiber glass, and is preferably about 2.5 osy (ounces per square yard) in weight.

Description of High Silica Fibers

Practice of the invention includes a fiber blend comprising amorphous silica fibers and at least one type of FR fiber. As will be explained in greater detail herein, the fiber blend can then be used to form fabrics, both non-wovens and woven fabrics, for a variety of uses. According to one exemplary embodiment, filters for lodging particulate matter are made from non-woven fabrics with the described fiber blend.

Generally, any amorphous silica fiber that improves the char strength when added to a fiber blend may be used. The term "silica" refers to silicon dioxide which occurs naturally in a variety of crystalline and amorphous forms. Silica is considered to be crystalline when the basic structure of the molecule (silicon tetrahedra arranged such that each oxygen atom is common to two tetrahedral) is repeated and symmetrical. Silica is considered to be amorphous if the molecule lacks crystalline structure. The SiO2 molecule is randomly linked, forming no repeating pattern. Crystalline silica is not desired because of the associated health effects related to fragmentation of its brittle crystalline structure into fragments of respirable size.

The amorphous silica fiber is a high-content silica fiber having a silica (SiO2) content of at least about 90 percent by weight, based upon the total weight of the high silica fiber. In one or more exemplary embodiments, the silica fibers have a silica content of at least about 65%, 70%, 75%, 85%, 90%, 95% or even 95% by weight. For example, the high silica fibers may contain about 98% by weight silica, with the balance predominantly containing alumina. In certain exemplary embodiments, the amount of halogen in the high silica fiber is less than about 120 parts per million by weight.

According to one exemplary embodiment, a non-woven filter media comprises silica fibers that have at least about 70% by weight silica. This silica can be amorphous silica According to another exemplary embodiment, a non-woven filter media has silica fibers that comprise at least about 85% by weight amorphous silica.

Preferably, in most exemplary embodiments, the silica fibers are substantially amorphous. While the fibers may contain some crystalline material, a substantial amount of crystallinity is not preferred. Suitable silica fiber is commercially available, for example from Polotsk-Steklovolokno, Belarus, through their U.S. agent, TMS in Sparks, Nev.

In one exemplary embodiment, the starting material composition for the high silica fibers is: 72-77% $SiO_2$, 2.5% B, 3.5% $Al_2O_3$, 20-25% $Na_2O$, 0.01-1.0% CoO and 0.01-0.5% $SO_3$, all percents by weight, based upon the total weight of the composition. The composition is melted at 1480±10° C. and a continuous fiber is formed. This fiber is then leached using hot sulphuric acid having a concentration of 2N at a temperature of 98±2° C. with a dwell time of 60 minutes. The fiber is then rinsed with tap water until the pH is about 3-5. In this exemplary embodiment, the resulting fiber has $SiO_2$ content of from about 95-99%±1 by weight, the remainder is predominantly $Al_2O_3$.

A high silica glass composition and process for making high silica fibers is described in Russian Pat. No. 2,165,393 (the '393 patent), which is hereby incorporated by reference herein. The high silica fibers of the '393 patent are described as having a lower coefficient of variation in the strength of the basic filaments, which gives the possibility to stabilize the strength characteristics of the resultant fiber, especially during use at high temperature. The following description of high silica fibers is taken from the '393 patent for exemplary purposes only and should not be construed to limit the invention.

In one or more exemplary embodiments, the glass composition, which includes $SiO_2$, $Al_2O_3$ and $Na_2O$, also includes CoO and $SO_3$ in the following proportions (percent mass):
$Al_2O_3$: 2.5-3.5
$Na_2O$: 20-25
CoO: 0.01-1.0
$SO_3$: 0.01-1.0
$SiO_2$: remaining The glass may contain at least one oxide from the group CaO, MgO, $ZrO_2$, $TiO_2$, $Fe_2O_3$ in the following quantities (percent mass):
CaO: 0.01-0.5
MgO: 0.01-0.5
$TiO_2$: 0.01-0.1
$Fe_2O_3$: 0.01-0.5
$ZrO_2$: 0.01-0.5

In another exemplary embodiment, the high-temperature silica fiber which, in addition to $SiO_2$ and $Al_2O_3$, also includes CoO and $SO_3$ in the following proportions (percent mass):
$SiO_2$: 94-96
$Al_2O_3$: 3-4
$Na_2O$: 0.01-1.0
CoO: 0.01-1.0
$SO_3$: 0.01-1.0

The silica fiber may also contain at least one oxide from the group CaO, MgO, $TiO_2$, $Fe_2O_3$, $ZrO_2$ in the following quantities (percent mass):
CaO: 0.01-0.5
MgO: 0.01-0.5
$TiO_2$: 0.01-0.1
$Fe_2O_3$: 0.01-0.5
$ZrO_2$: 0.01-0.5

In one exemplary embodiment, the silica fibers are substantially free of any metal oxide coating. The diameter of the silica fibers may range from about 5.6 microns to about 12.6 microns and, in one exemplary embodiment, the diameter is about 8 microns. Length of the silica fibers may range from about 50 millimeters to about 125 millimeters and, in one exemplary embodiment, the length is about 75 millimeters, (shorter and longer fibers are available by adjusting the cut length of the fiber, but are usually not practical for needle-punch applications).

Preparation of Glass Fibers

The preparation of glass fibers according to the aforementioned Russian patent, No. 2,165,393, Examples 1-3, is set forth as follows: To produce continuous filament glass fiber of the proposed composition, prepare a vessel containing (percent mass) $SiO_2$: 72.39, $Al_2O_3$: 2.5, $Na_2O$: 25, CoO: 0.01, $SO_3$: 0.1. Load the vessel into a furnace and melt at a temperature of 1480±10° C. From the molten glass mass, a continuous glass fiber is formed with a diameter of 6-9 microns at a temperature of 1260±50° C. using 400-hole glass-forming aggregates. The resultant fiber has a strength of 1030 Mpa and surface tension of 0.318H/m.

Leaching takes place using a hot sulfuric acid solution concentration 2N (about 10%) at a temperature of 98±2° C. Contact time for the fiber in the solution is 60 minutes. Wash away the leaching solution, reaction products, and sizing remains from the leached fiber with tap water until the pH is at 3-5. Final washing of the fiber is done with deionized water and simultaneous dehydration.

The preparation of the glass composition, its processing and leaching for examples 2 and 3 are analogous to example 1. Tables 1 and 2 present the glass composition, characteristics of the molten product, characteristics of processing, and the characteristics of the glass and silica fibers. Table 3 provides strength characteristics of the silica materials after exposure to 1000° C.

Tables 1 through 3 also provide data confirming that the introduction of cobalt and $SO_3$ into the glass composition increases the heterogeneity of the glass mass, lowers its surface tension, decreases the fragility of the fiber during processing and also increases the stability of the technical characteristics of the silica fiber and resultant materials based on this fiber.

TABLE 1

| Component | Glass Composition | | | Silica Composition | | |
|---|---|---|---|---|---|---|
| | 1 | 2 | 3 | 1 | 2 | 3 |
| $SiO_2$ | 72.39 | 73.0 | 76.94 | 95.65 | 93.87 | 96.58 |
| $Al_2O_3$ | 2.5 | 3.5 | 3.0 | 2.8 | 3.9 | 3.2 |
| $Na_2O$ | 25 | 22 | 20 | 0.32 | 0.23 | 0.12 |
| CoO | 0.01 | 1.0 | 0.05 | 0.03 | 1.3 | 0.08 |
| $SO_3$ | 0.1 | 0.5 | 0.01 | 1.2 | 0.7 | 0.02 |
| Surface tension of molten glass N/m* | 0.318 | 0.27 | 0.29 | — | — | — |

*Surface tension of molten glass taken as a prototype is 0.228 N/m.

TABLE 2

| | Composition No. 1 | Composition No. 2 | Composition No. 3 | Prototype |
|---|---|---|---|---|
| Precursor Glass fiber | | | | |
| Strength, Mpa | 1030 | 1150 | 1220 | 1020 |
| Coefficient of strength variation, % | 12.2 | 10.6 | 9.2 | 14.7 |
| Coefficient of useful work (CUW) for crucible during glass production | 0.75 | 0.72 | 0.78 | 0.68 |
| Silica Fiber | | | | |
| Strength, Mpa | 800 | 860 | 925 | 750 |
| Coefficient of strength variation, % | 12.4 | 11.7 | 9.6 | 15.9 |
| Silica Fabric | | | | |
| Breaking Load, N | 274 | 305 | 338 | — |
| Coefficient of strength variation, % | 13.9 | 12.4 | 10.1 | — |
| Silica Yarn | | | | |
| Breaking Load, N | 61 | 69 | 73 | — |
| Coefficient of breaking load variation, % | 14.8 | 12.6 | 10.9 | — |
| Silica Tape | | | | |
| Breaking Load, N | 1700 | 1920 | 2150 | — |
| Coefficient of breaking load variation, % | 13.2 | 12.7 | 10.3 | — |

TABLE 3

Breaking Load Silica Material after Heat Processing at 1000° C.

| Composition No. | Silica Fabric | Silica Yarn | Silica Tape |
|---|---|---|---|
| 1 | 174 | 12.1 | 142 |
| 2 | 207 | 14.3 | 157 |
| 3 | 254 | 18.1 | 164 |

Tables 4 and 5 below shows various glass fiber compositions from which it can be seen that the silica fibers taught by the Russian Pat. No. 2,165,393 differ from all other glass fiber types by the presence of trace amounts of CoO and $SO_3$.

TABLE 4

| Glass Type | Country | Org. | $SiO_2$ | $Al_2O_3$ | $B_2O_3$ | CaO | MgO | $TiO_2$ |
|---|---|---|---|---|---|---|---|---|
| TYPE A | | | | | | | | |
| Glass A | US | | 71.8 | 1.0 | | 8.8 | 3.8 | |
| Neutral | USSR | GIS | 71.0 | 3.0 | | 8.5 | 2.5 | |
| No. 65 | USSR | VNIISV | 60.0 | 3.0 | | 8.0 | 3.0 | |
| No. 70 | USSR | VNIISV | 69.0 | 3.0 | | 8.0 | 3.0 | |
| TYPE E | | | | | | | | |
| Std, Alkali Free with 10% B2O3 | USSR | VNIISV | 54.0 | 14.5 | 10.0 | 16.5 | 4.0 | |
| Alkali free with 8% B2O3 | USSR | VNIISV | 54.0 | 14.5 | 8.0 | 18.0 | 4.5 | |
| T-273A | USSR | VNIISPV | 55.5 | 16.0 | | 14.0 | 8.0 | 6.0 |
| No. 2334961 | US | Owens Corning | 52-56 | 12.0-16.0 | | 16.0-19.0 | | |
| No. 621 No. 2571074 | US | Owens Corning | 52-56 | 12.0-16.0 | 8.0-13.0 | 19.0-25.0 | | |
| No. 4542106 | US | PPG | 58-60 | 11.0-13.0 | | 21.0-23.0 | 1.0-4.0 | 1.0-5.0 |
| No. 3037136 | JAPAN | NIPPON | 54-57 | 13.0-16.0 | | 21.0-23.0 | 0.6-3.0 | 0-1.0 |
| ECRGLAS | US | Owens Corning | 54-65 | 9.0-15.0 | | 17.0-25.0 | 0-4.0 | |
| Advantex, No. 5789329 | US | Owens Corning | 59.9 | 13.5 | | 22.3 | 3.2 | 0.2 |
| TYPE C | | | | | | | | |
| No. 2308857 | US | Owens Corning | 65.0 | 3.8 | 5.5 | 13.7 | 2.4 | |
| No. 4628038 | US | Owens Corning | 53.3 | 16.0 | 3.0 | 15.8 | 2.5 | 0-2.0 |
| No. 7, No. 289991 | USSR | VNIISV | 64.0 | 5.5 | | 12.0 | 2.0 | 2.0 BaO |
| No. 7-A, No. 787382 | USSR | VNIISPV | 64.0 | 4.5 | | 12.0 | 12.0 | 0.2 |
| TYPE D | | | | | | | | |
| D (US) | US | | 75.5 | 0.5 | 20.0 | 0.5 | | |
| D-4.5 | USSR | VNIISPV | 51-71 | 1.0-5.0 | 25.0-45.0 | | | |
| No. 63002831 | JAPAN | Nippon | 70-80 | | 15.0-21.5 | | | |
| No. 8333137 | JAPAN | Nitto-boseki | 50-60 | 10.0-20.0 | 20.0-30.0 | | | |

TABLE 4-continued

| Glass Type | ZrO₂ | ZnO | Na₂O + K₂O | Fe₂O₃ | F₂ | CoO | SO₃ | B | CuO | Ni₂O₃ | CrO₃ |
|---|---|---|---|---|---|---|---|---|---|---|---|
| TYPE A | | | | | | | | | | | |
| Glass A | | | 14.2 | 0.5 | | | | | | | |
| Neutral | | | 15.0 | | | | | | | | |
| No. 65 | 6.0 | | 12.0 | 2.0 | | | | | | | |
| No. 70 | 1.0 | | 14.0 | 2.0 | | | | | | | |
| TYPE E | | | | | | | | | | | |
| Std, Alkali Free with 10% B2O3 | | | | 0-1.0 | 0.5 | 0.3 | | | | | |
| Alkali free with 8% B2O3 | | | | 0-1.0 | 0.5 | 0.3 | | | | | |
| T-273A | | | | 0-1.0 | 0.5 | 0.4 | | | | | |
| No. 2334961 | | | | | | | | | | | |
| No. 621 | | | | | UP TO 3.0 | | | | | | |
| No. 2571074 | | | | | | | | | | | |
| No. 4542106 | | | | 0-1.0 | | | | | | | |
| No. 3037136 | | | | 0-1.0 | 0-1.0 | | | | | | |
| ECRGLAS | | 2.5-5.0 | | 0-1.0 | | | | | | | |
| Advantex, No. 5789329 | | | | 0.3 | 0-1.0 | | | | | | |
| TYPE C | | | | | | | | | | | |
| No. 2308857 | | | | 8.5 | 0.3 | | | | | | |
| No. 4628038 | | | | 7.0 | 0-2.0 | | | | | | |
| No. 7, No. 289991 | 2.0 | 1.7 Mn₃O₄ | | 9.5 | | 0.3 | | | | | |
| No. 7-A, No. 787382 | 4.2 | | | 11.5 | | 0.3 | | | | | |
| TYPE D | | | | | | | | | | | |
| D (US) | | | | 3.0 | | | | | | | |
| D-4.5 No. 63002831 | | | | 2.0-5.0 | | | | | | | |
| No. 8333137 | | | | | | | | | | | |

TABLE 5

| Glass Type | Country | Org. | SiO₂ | Al₂O₃ | B₂O₃ | CaO | MgO | TiO₂ | ZrO₂ |
|---|---|---|---|---|---|---|---|---|---|
| TYPE S | | | | | | | | | |
| No. 3402055 | US | Owens Corning | 55.0-79.9 | 12.6-32.0 | | | 4.0-20.0 | | |
| No. 3459568 | US | PPG Industries | 54.0-62.0 | 20.0-27.0 | | | | 10.0 | |
| R. No. 1435073 | FRANCE | VETROTEX | 55.0-65.0 | 20.0-30.0 | | 5.0-20.0 | 2.0-10.0 | | |
| No. 11021147 | JAPAN | Nitto-Boseki | 60.0-70.0 | 17.0-27.0 | | | 7.0-17.0 | | |
| VMP | USSR | VNIISPV | 58.0-73.0 | 15.0-25.0 | | | 4.0-15.0 | 0.3-2.8 | 0.3-0.7 |
| VM-1 | USSR | VNIISPV | 55.0-57.0 | 24.0-26.0 | | | 14.0-16.0 | 1.3-2.7 | |
| No. 2129102 Alkali-Res. | USSR | Steklopl Astic co. | 57.0-60.0 | 20.0-27.0 | | | 10.0-16. | 0.2-0.7 | 0-0.2 |
| Cemfil, No. 1243972 | UK | Pilkington | 71.0 | 1.0 | | | | | 16.0 |
| AR. No. 5307116 | JAPAN | Kanebo LTD. | 60.7 | | | | | | 21.5 |
| Sheh-15Zh, Inventors Certificate No. 451652 | USSR | GIS | 65.8 | 5.6 | | 7.4 | | | 7.4 |
| Sheh-15Zh, Inventors Certificate No. 874689 | USSR | GIS | 63.0 | 4.1 | | 9.2 | 0.3 | 6.2 | 3.5 |
| No. 2083516 | USSR | D.i.medel EEV RkhTU | 50.6-60.0 | 12.0-23.0 | | 5.0-14.0 | 0.5-11.0 | | 0.1-0.5 |

TABLE 5-continued

Hi Silica

| Name | Country | Manufacturer | Col1 | Col2 | Col3 | Col4 | Col5 | Col6 | Col7 |
|---|---|---|---|---|---|---|---|---|---|
| Russian patent 2165393-Precursor Glass | USSR | Npob StekloplAstik Aoot | 72.0-77.0 | 2.5-3.5 | | | | | |
| Russian patent 2165393-Silica Fiber after leaching precursor | USSR | Npob Steklopl Astik Aoot | 94.0-97.0 | 2.8-3.9 | | | | | |
| Q-Fiber | US | Johns Manville | 99.68 | 0.13 | | 0.3 | 0.01 | 0.01 | |
| OMNISIL | USSR | Polotsk-steklov Olokno | | | | | | | |
| REFRASIL | US | HITCO | 98.8 | 0.16 | 0.29 | 0.044 | 0.0041 | 0.47 | 0.024 |
| AMISIL | US | Auburn Manufacturing | 97.9 | 0.71 | 0.16 | 0.23 | 0.17 | 0.8 | 0.01 |

| Glass Type | ZnO | $Na_2O + K_2O$ | $Fe_2O_3$ | $F_2$ | CoO | $SO_3$ | B | CuO | $Ni_2O_3$ | $CrO_3$ |
|---|---|---|---|---|---|---|---|---|---|---|
| TYPE S | | | | | | | | | | |
| No. 3402055 | | | | | | | | | | |
| No. 3459568 | | 0-2.0 $LiO2$ | | | | | | | | |
| R. No. 1435073 | | | | | | | | | | |
| No. 11021147 | | 0.1-0.5 | | | | | | | | |
| VMP VM-1 | | 0.5 | | | | | | | | |
| No. 2129102 | | 0.1-0.4 | 0.1-0.6 | | | | | | | |
| Alkali-Res. | | | | | | | | | | |
| Cemfil, No. 1243972 | 1.0 $Li2O$ | 11.0 | | | | | | | | |
| AR. No. 5307116 | 16.5 $Li2O$ | 1.3 | | | | | | | | |
| Sheh-15Zh, Inventors Certificate No. 451652 | | 9.0 | 4.7 | | | | | | | |
| Sheh-15Zh, Inventors Certificate No. 874689 | | 8.3 | 4.7 | | | | | | | |
| No. 2083516 | | 12.5-19.0 | | | | | | | | |
| Hi Silica | | | | | | | | | | |
| Russian patent 2165393-Precursor Glass | | 20.0-25.0 $Na2O$ | | | 0.1-1.0 | 0.01-0.5 | | | | |
| Russian patent 2165393-Silica Fiber after leaching precursor | | 0.12-0.32 $Na2O$ | | | 0.03-1.3 | 0.02-1.2 | | | | |
| Q-Fiber | | 0.03 | 0.04 | | | | 0.01 | | | |
| OMNISIL | | | | | | | | | | |
| REFRASIL | | | | | | | | 0.0004 | | 0.0046 |
| AMISIL | | 0.03 | 0.01 | | | | | <0.01 | <0.01 | |

FR Fibers

Having discussed the amorphous silica component of the invention, the additive fibers will be discussed next. In the following discussion, use of the term "silica fiber" shall be understood to mean those fibers containing amorphous (as opposed to crystalline) silica.

The amount of silica fiber in the fiber blend of amorphous silica and FR fibers can vary, depending upon the FR fibers used. In one exemplary embodiment, the amount of silica fiber in the blend is from about 5 to about 65 weight percent, based upon the total weight of the blend. In another exemplary embodiment, the amount of silica fiber in the blend is from about 15 to about 50 weight percent. In another exemplary embodiment, the amount of silica fiber in the blend is from about 20 to about 30 weight percent. The remaining fibers in the blend include the necessary amount of non-amorphous fibers, namely the FR fibers, to equal 100 weight percent.

In other words, the fabric of the invention also typically includes at least one flame retardant or flame resistant (FR) fiber and the term FR, as used herein includes both types. Various FR fibers are known in the art. The FR fibers employed in the fabrics of the invention may be an inherent flame resistant fiber or a fiber (natural or synthetic) that is coated with an FR resin. The inherent flame resistant fibers are not coated, but have an FR component incorporated within the structural chemistry of the fiber. The term FR fiber, as used herein, includes both the inherent flame resistant and flame retardant fibers as well as fibers that are not inherently flame resistant or flame retardant, but are coated with FR resins. Accordingly, by way of example, a polypropylene fiber coated with an FR resin would be an FR polypropylene fiber.®

Examples of inherently flame resistant fibers include polymer fibers having a phosphorus-containing group, an amine, a modified aluminosilicate, or a halogen-containing group. Specific examples of inherently flame-retardant fibers include melamines, meta-aramids, para-aramids, polybenzimidazole, polyimides, aromatic polyimides, polyamideimides, partially oxidized polyacrylonitriles, novoloids, poly(p-phenylene benzobisoxazoles), poly(p-phenylenebenzothiazoles), polyphenylene sulfides, flame retardant viscose rayons; (e.g., a viscose rayon based fiber containing 30% aluminosilicate modified silica, $SiO_2 + Al_2O_3$), polyetheretherketones, polyketones, polyetherimides, and combinations thereof).

Melamines include those sold under the tradenames Basofil by McKinnon-Land-Moran LLC. Meta-aramids include poly(m-phenylene isophthalamide), for example sold under the tradenames NOMEX® by E.I. Du Pont de Nemours and Co., TEIJINCONEX® and CONEX® by Teijin Limited and FENYLENEL® by Russian State Complex. Para-aramids include poly (p-phenylene terephthalamide), for example sold under the tradename KEVLAR® by E.I. Du Pont de Nemours and Co., and poly(diphenylether para-aramid), for example sold under the tradename TECHNORA® by Teijin Limited, and under the tradenames TWARON® by Acordis and FENYLENE ST® (Russian State Complex).

Polybenzimidazole is sold under the tradename PBI by Hoechst Celanese Acetate LLC. Polyimides include those sold under the tradenames P-84® by Inspec Fibers and KAPTON® by E.I. Du Pont de Nemours and Co. Polyamideimides include for example those sold under the tradename KERMEL® by Rhone-Poulenc. Partially oxidized polyacrylonitriles include, for example, those sold under the tradenames FORTAFIL OPF® by Fortafil Fibers Inc., AVOX® by Textron Inc., PYRON® by Zoltek Corp., PANOX® by SGL Technik, THORNEL® by American Fibers and Fabrics and PYROMEX® by Toho Rayon Corp.

Novoloids include, for example, phenol-formaldehyde novolac, such as that sold under the tradename KYNOL® by Gun Ei Chemical Industry Co. Poly(p-phenylene benzobisoxazole) (PBO) is sold under the tradename ZYLON® by Toyobo Co. Poly(p-phenylene benzothiazole) is also known as PBT. Polyphenylene sulfide (PPS) includes those sold under the tradenames RYTON® by American Fibers and Fabrics, TORAY PPS® by Toray Industries Inc., FORTRON® by Kureha Chemical Industry Co. and PROCON® by Toyobo Co.

Flame retardant viscose rayons include, for example, those sold under the tradenames LENZING FR® by Lenzing A. G. and VISIL® by Sateri Oy Finland. Polyetheretherketones (PEEK) include, for example, that sold under the tradename ZYEX® by Zyex Ltd. Polyketones (PEK) include, for example, that sold under the tradename ULTRAPEK® by BASF. Polyetherimides (PEI) include, for example, that sold under the tradename ULTEM® by General Electric Co.

Modacrylic fibers are made from copolymers of acrylonitrile and other materials such as vinyl chloride, vinylidene chloride or vinyl bromide. Flame retardant materials such as antimony oxide can be added to further enhance flame resistant property. Modacrylic fibers used in this invention are manufactured by Kaneka under the product names KANECARON PBX and PROTEX-M, PROTEX-G, PROTEX-S and PROTEX-PBX. The latter products contain at least 75% of acrylonitile-vinylidene chloride copolymer. SEF PLUS by Solutia is a modacrylic fiber as well with flame retardant properties.

Further examples of inherent FR fibers suitable for use in the fabric of the invention include polyester with phosphalane such as that sold under the trademark TREVIRA CS® fiber or AVORA® PLUS FIBER by KoSa.

Also useful are chloropolymeric fibers, such as those sold under the tradenames THERMOVYL® L9S & ZCS, FIRBRAVYL® L9F, RETRACTYL® L9R, ISOVYL® MPS by Rhovyl S. A., PIVIACID®, Thueringische, VICLON® by Kureha Chemical Industry Co., TEVIRON® by Teijin Ltd., ENVILON® by Toyo Chemical Co., VICRON®, SARAN® by Pittsfield Weaving, KREHALON® by Kureha Chemical Industry Co., OMNI-SARAN® by Fibrasomni, S. A. de C. V., and combinations thereof. Fluoropolymeric fibers such as polytetrafluoroethylene (PTFE), poly(ethylene-chlorotrifluoroethylene (E-CTFE), polyvinylidene fluoride (PVDF), polyperfluoroalkoxy (PFA), and polyfluorinated ethylene-propylene (FEP) and combinations thereof are also useful.

The fabrics of the invention comprise mixtures of high silica fibers with FR fibers. The fibers high silica can range from about 1% to about 99% by weight, as is true for the FR fibers, to total 100% in the mixture.

Natural or synthetic fibers coated with an FR resin are also useful in the fabric of the invention. Suitable fibers coated with an FR resin include those where the resin contains one or more of phosphorus, phosphorus compounds, red phosphorus, esters of phosphorus, and phosphorus complexes; amine compounds, boric acid, bromide, urea-formaldehyde compounds, phosphate-urea compounds, ammonium sulphate, or halogen based compounds. Non-resin coatings like metallic coating are not preferred for the invention, because they tend to flake-off after continuous use of the product. Commercially available FR resins are sold under the trade names GUARDEX FR®, and FFR® by Glotex Chemicals in Spartanburg, S.C.

The manner in which the resin is coated onto the fiber is not particularly limited. In one exemplary embodiment, the FR resin is a liquid product that can be applied as a spray. In another exemplary embodiment, the FR resin is a solid that may be applied as a hot melt product to the fibers, or as a solid powder that is then melted into the fibers. In one exemplary embodiment, the FR resin is applied to the fibers in an amount of from about 6 to about 25 weight %, based upon the total weight of the coated fibers.

The amount of coated FR fiber in the blend can vary, but is from about 35 to about 95 weight percent, based upon the total weight of the blend. In one exemplary embodiment, the amount of coated FR fiber in the blend is from about 40 to about 90 weight percent. In another embodiment, the amount of coated FR fiber in the blend is from about 45 to about 85 weight percent.

The denier of the FR fibers is from about 1.5 to about 15 dpf (denier per filament). The foregoing listing of FR fibers is not to be construed as a limiting the practice invention but instead to illustrate the fact that any FR fiber known can be employed with an amorphous silica fiber and utilized in the practice of the invention. Thus, fiber types includes multifilament and monofilament yarns, having a variety of cross-sections and shapes as well as fibrillated yarns, typically manufactured from slit films or tapes.

The fabric of the invention may further contain one or more non-FR fibers. The non-FR fibers may be synthetic or natural fibers. Suitable non-FR synthetic fibers include polyester such as polyethylene terephthalate (PET); cellulosics, such as rayon and/or lyocell; nylon; polyolefin such as polypropylene fibers; acrylic; melamine and combinations thereof. The lyocell fibers are a generic classification for solvent-spun cellulosic fibers. These fibers are commercially available under the name TENCEL®. Natural fibers include flax, kenaf, hemp, cotton and wool. In one exemplary embodiment, non-FR fibers are employed to enhance certain characteristics such as loft, resilience or springiness, tensile strength, and thermal retention.

The fiber blend includes amorphous silica fiber and at least one type of FR fiber. Therefore, the present invention is embodied by a fiber blend that contains amorphous silica fiber, an FR fiber, optionally additional FR fibers, and optionally one or more non-FR fibers. In one exemplary embodiment, the fiber blend includes: modacrylic fiber; a cellulosic fiber, lyocell, and amorphous silica fiber.

In another exemplary embodiment, the fiber blend further includes more than one type of FR fiber. In another exemplary embodiment, the fiber blend includes amorphous silica fiber, modacrylic fiber, and VISIL. In yet another exemplary embodiment, the fiber blend includes modacrylic fiber, FR rayon fiber, and amorphous silica fiber.

In another exemplary embodiment, the fiber blend includes modacrylic fibers, VISIL (FR viscose rayon) fibers, amorphous silica fibers, and FR polypropylene fibers. The amounts of each component can vary; however, advantageous char strength is obtained when a needle-punched fabric is prepared from a blend containing about 40 weight percent modacrylic, about 40 weight percent VISIL, about 15 weight percent amorphous silica, and about 5 weight percent FR polypropylene fibers.

The non-woven fabric of the invention may be produced by mechanically interlocking the fibers of a web. The mechanical interlocking is preferably achieved through a carded/needle-punch operation. Needle-punch methods of preparing non-woven fabric are known in the art. In one exemplary embodiment, the non-woven fabric, sometimes called a batt, may be constructed as follows: the fiber blend is weighed and then dry laid/air laid onto a moving conveyor belt. The speed of the conveyor belt can be adjusted to provide the desired batt weight. Multiple layers of batts are fed through a needle loom where barbed needles are driven through the layers to provide entanglement.

There are several other known methods for producing non-woven fabrics including hydroentanglement (spunlace), thermal bonding (calendering and/or though-air), latex bonding or adhesive bonding processes. The spunlace method is similar to needlepunch except waterjets are used to entangle the fibers instead of needles. Thermal bonding requires either some type of thermoplastic fiber or powder to act as a binder. Reference to non-woven fabrics herein includes all forms of manufacture.

Suitable non-woven fabrics of the present invention have a batt weight greater than about 2.25 oz./sq. yd. (osy). In one exemplary embodiment, the batt weight ranges from about 2.25 osy to about 20 osy. In one exemplary embodiment, the fibers are carded. Then the conveyor belt moves to an area where spray-on material may optionally be added to the non-woven batt. For example, the FR resin may be sprayed onto the nonwoven batt as a latex. In one exemplary embodiment, the conveyor belt is foraminous, and the excess latex spray material drips through the belt and may be collected for reuse later. After the optional spraying, the fiber blend is transported to a dryer or oven. The fibers may be transported by conveyer belt to the needlepunch loom where the fibers of the batt are mechanically oriented and interlocked to form a non-woven fabric.

Baghouse Filter Application

Figure 1:
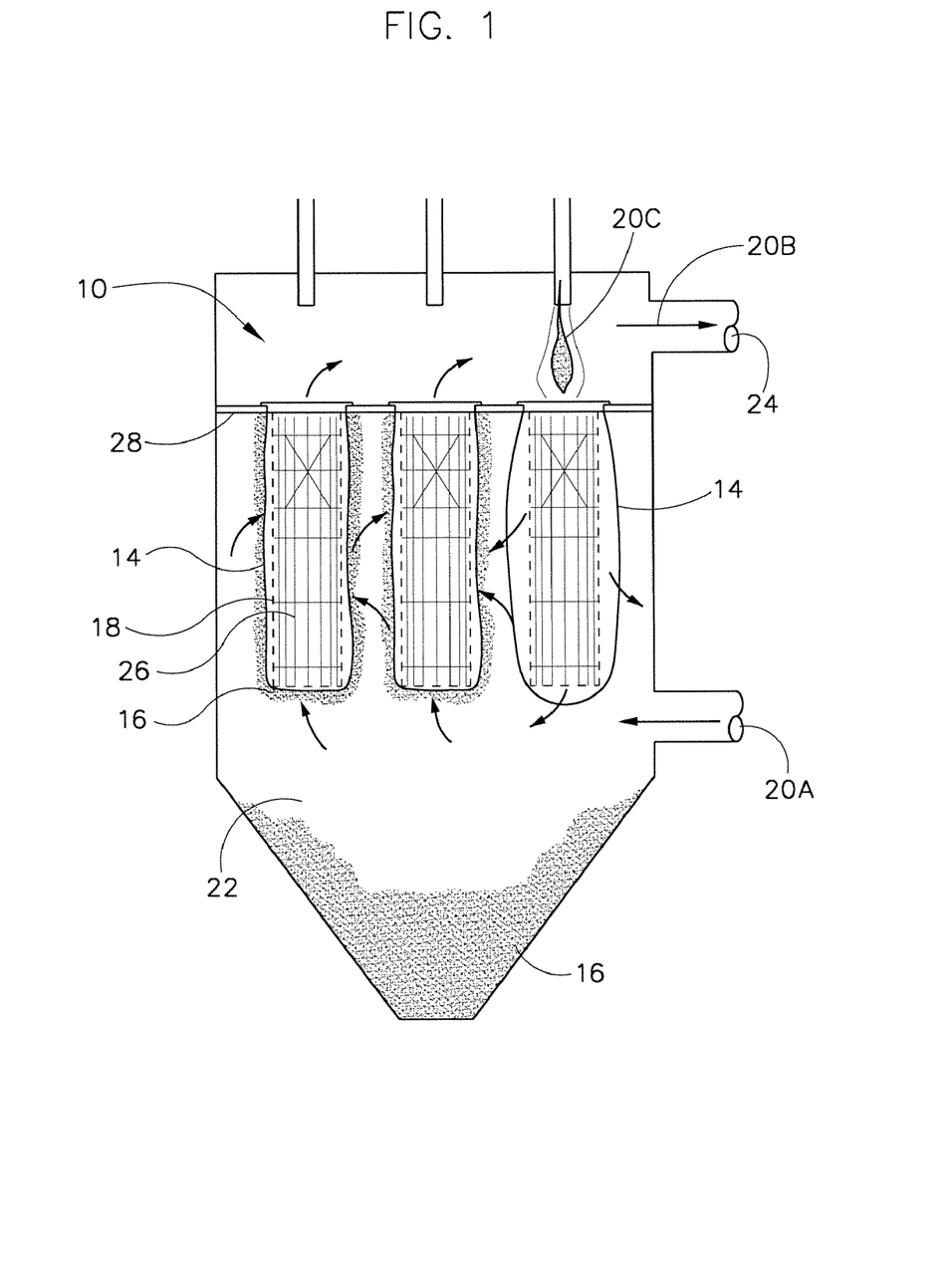
FIG. 1 is an exemplary diagrammatic view of a pulsed reverse flow baghouse filter arrangement for which filter media of the invention is particularly well suited according to one exemplary embodiment of the invention.

With reference to FIG. 1, therein is diagrammatically illustrated a representative baghouse filter structure for use with the filter media of the invention according to one exemplary embodiment. This type of baghouse filter structure 10 is typically employed in industrial applications requiring filtration of particulate material 16 from a input fluid stream 20A. As illustrated, the input fluid stream 20A enters a filter chamber 12, within which, one or more generally tubular, sleeve-like filter bags 14 are arranged. The filter bags 14 may each enclose a filter laminate structure 18 and a cage structure 26. The filter bags 14 may be supported by a tube sheet 28.

The input fluid stream 20A, such as a hot gas like steam, can flow through the exterior surface of the filter bags 14 by the creation of a pressure differential across the filter media or structure 10, with particulate material 16 removed from the input fluid stream 20A as the material 16 lodges against the filter media 10. The filtered fluid stream 20B can then exit the filter chamber 12 at exit conduit 24. As noted above, one advantage of the filter bags 14 made in accordance with the invention is that they have increased heat resistance and resistance to flaming or charring. The filter bags 14 are preferably made from a non-woven fabric that is flame resistant and is manufactured from a blend of fibers comprising amorphous silica fibers and at least one fiber consisting of a flame resistant (FR) fiber.

Typically, the particulate material 16 can be dislodged from the exterior of the filter bags 14 by periodically subjecting each filter bag 14 to a pulsed reverse-flow of fluid 20C. Under this pulsed reverse-flow of fluid 20C through the filter media 10, the particulate material 16, typically referred to as filter cake, is forced from the exterior of each filter bag 14, and collected at a lower portion of the filter chamber 12, referred to as a hopper 22.

The baghouse filter media 10 embodying the principles of the invention may be configured as a filter bag 14 illustrated in FIG. 1. For such applications, the filter media 10 may be formed as a planar sheet, with opposite edges joined to form an open-ended tube. The tube can then be closed at one end to form a sleeve-like bag 14, as illustrated in FIG. 1. For other applications, the filter media may be employed in its planar form (not illustrated), or in the form of an open-ended tube.

Figure 2:
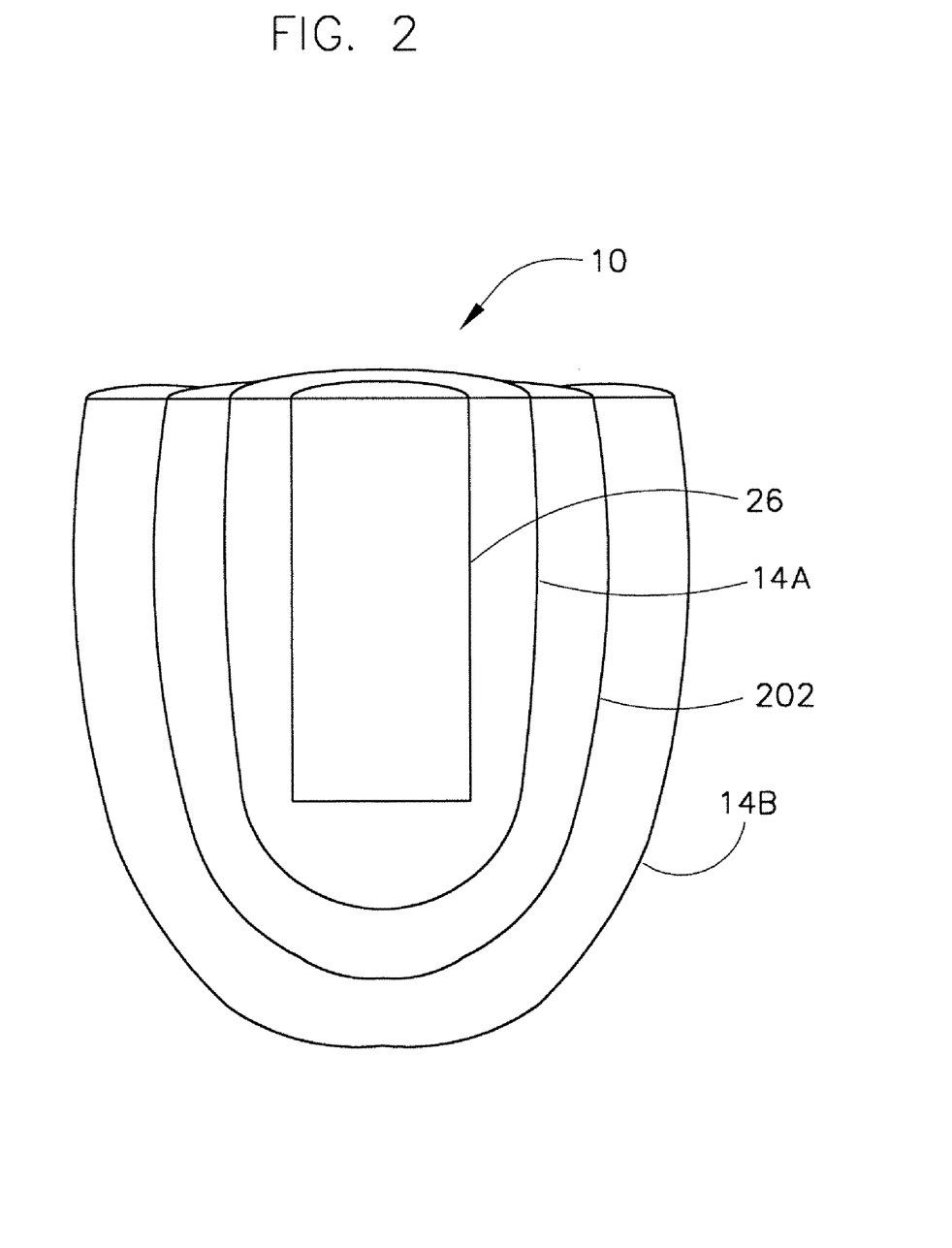
FIG. 2 illustrates further details of the exemplary filter media illustrated in FIG. 1 according to one exemplary embodiment of the invention.

Referring now to FIG. 2, this figure illustrates further details of the exemplary filter media 10 illustrated in FIG. 1 according to one exemplary embodiment of the invention. The separation between the structures 26, 14A, 202, and 14B illustrated in FIG. 2 have been exaggerated to show detail.

The filter media 10 can comprise a cage 26, an inner scrim 202, and two peripheral layers 14A and 14B that surround our encapsulate the inner scrim 202. The cage 26 can be made from metal to form a wire cage 26 but other materials are not beyond the invention. The cage 26 can be made from a flexible material or inflexible material so that the cage 26 is flexible or resists flexing (or is stiff).

The inner scrim 202 can be made from a woven material. In one exemplary embodiment, the two peripheral layers 14A, 1B of fiber of the inventive filter are separated by the woven scrim 202, which can becomes bound to the two peripheral layers 14A, 14B in a needle punching operation. The woven scrim 202 can be any made of any material that can withstand the physical demands required of the material, such as fiber glass, and is preferably about 2.5 osy (ounces per square yard) in weight. The peripheral layers 14A, 14B are preferably made from a non-woven fabric that is flame resistant and is manufactured from a blend of fibers comprising amorphous silica fibers and at least one fiber consisting of a flame resistant (FR) fiber.

Figure 3:
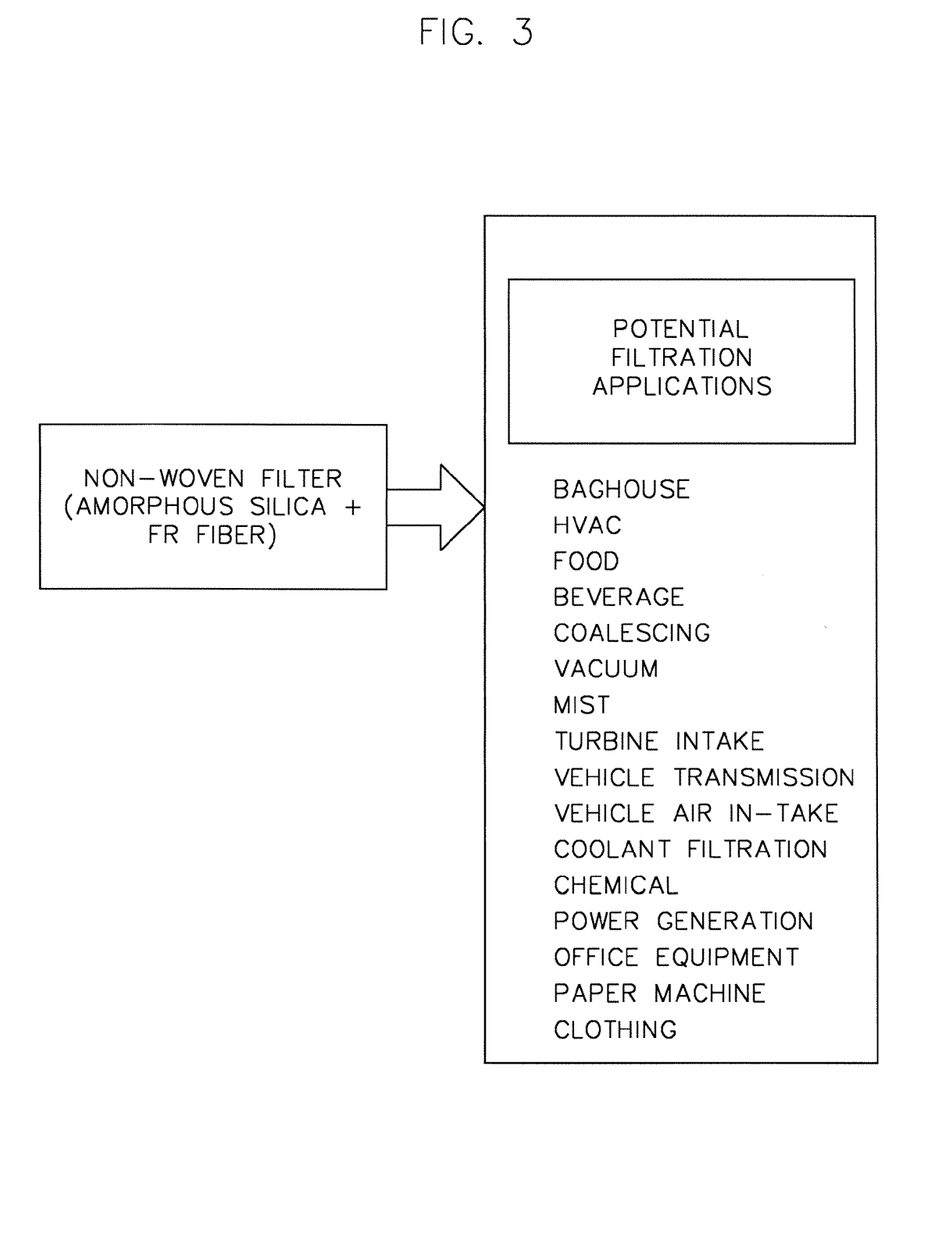
FIG. 3 illustrates potential filter applications for the inventive filter material according to exemplary embodiments of the invention.

Referring now to FIG. 3, this figure illustrates potential filter applications for the inventive filter material 300 according to exemplary embodiments of the invention. Potential filtration applications 305 of the inventive filter 300 besides baghouse filtration include HVAC filtration, wherein a frame with a filter media is placed in the path of the flow of air to remove particles such as dust from the air before the air is circulated into a room. Food and beverage filtration is another application, whereby a filter may be placed before or after the fluid contacts the beverage making substances in order to remove contaminants from the fluid. Coalescing filtration is yet another application, such as used in diesel engines and marine applications. Still other potential filtration applications include vacuum filter equipment, mist elimination, turbine intake filtration, automotive and truck transmission and air in-take filtration, coolant filtration, chemical filtration, including medical and pharmaceutical filtration, power generation filtration, office equipment filtration, paper machine, clothing felt and drain layer filtration, as well as any other like filtration applications.

Figure 4:
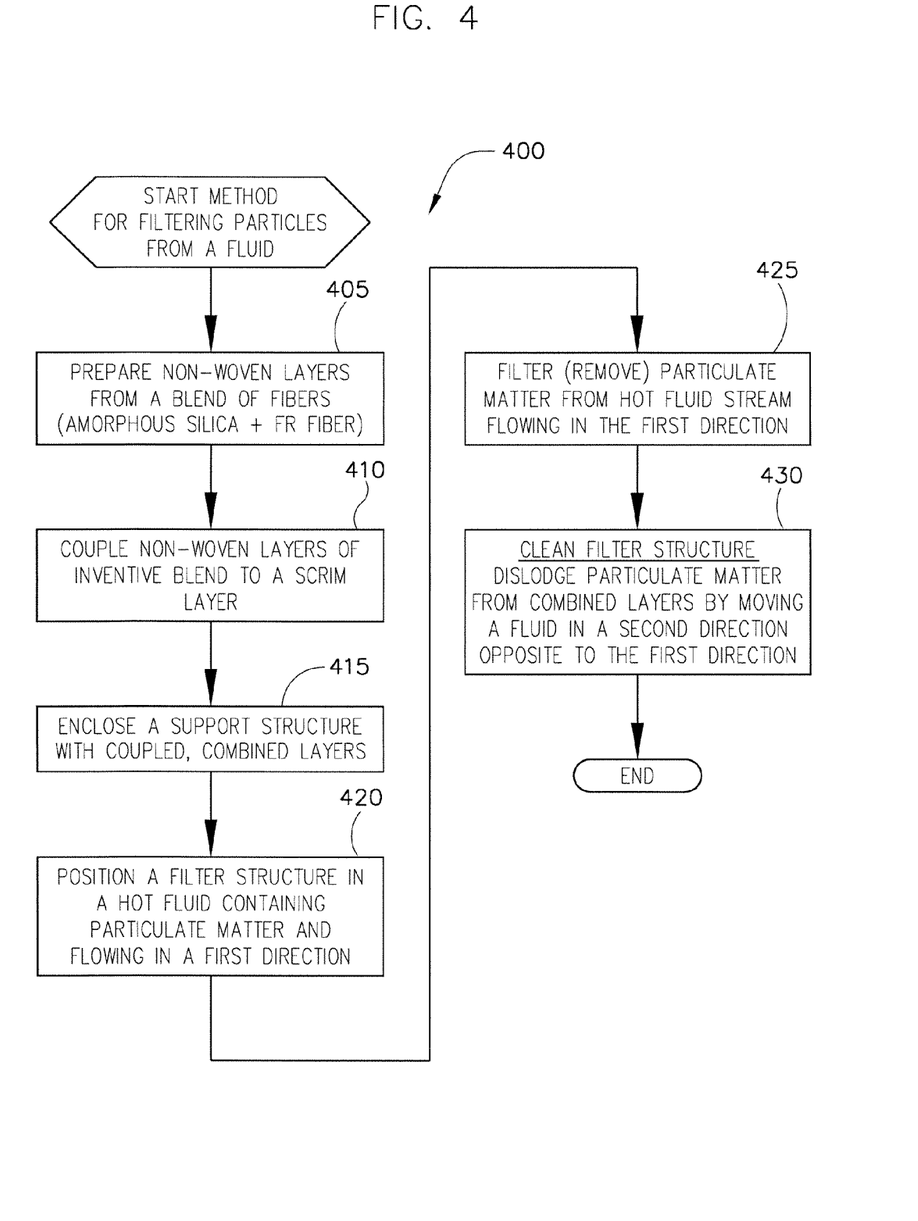
FIG. 4 illustrates a method of filtering particles from a fluid, such as a hot gas as illustrated in FIG. 1 according to one exemplary embodiment of the invention.

Referring now to FIG. 4, this figure illustrates a method 400 of filtering particles from a fluid, such as a hot gas as illustrated in FIG. 1 according to one exemplary embodiment of the invention. Step 405 is the first step in the process 400 of filtering particles from a fluid, in which non-woven layers 14 from a blend of fibers are manufactured. In one exemplary embodiment, the peripheral layers 14A, 14B of the filter are preferably made from a non-woven fabric that is flame resistant and is manufactured from a blend of fibers comprising amorphous silica fibers and at least one fiber consisting of a flame resistant (FR) fiber.

Next, in step 410, the peripheral non-woven layers 14A, 14B can become coupled through a needle punching operation to a woven scrim 202 as illustrated in FIG. 2. The woven scrim 202 can be any made of any material that can withstand the physical demands required of the material, such as fiber glass, and is preferably about 2.5 osy (ounces per square yard) in weight. This step is optional. The non-woven layers 14A, 14B may not be coupled to a woven layer or any other type of layers without departing from the scope of the invention.

Next, in step 410, the non-woven layers 14A, 14B and scrim 202 can enclose a support structure like a wire cage 26 as illustrated in FIG. 2. This step is also optional and can vary depending on how the peripheral non-woven layers 14A, 14B are used in a particular filtering operation. In some cases, the peripheral layers 14A, 14B may not enclose a support structure, like wire cage 26.

Next, in step 420, the resultant filter structure 10 can be positioned in a fluid stream 20A containing particulate matter 16 such as illustrated in FIG. 1 and that flows in a first direction. The fluid stream 20A or particulate matter 16 (or both) can be very hot such as on the order of 900° Celsius and will not cause the filter structure to become ignited.

In step 425, the particulate matter 16 can be filtered or removed from the fluid stream 20A that is flowing in the first direction. Next, in step 430, the filter structure 10 can be cleaned by dislodging the particulate matter 16 from the filter structure 10 by moving a fluid stream (usually a second fluid stream 20C) in a second direction that is opposite to the first direction of the first fluid stream 20A. The process then ends.

Physical Properties

The non-woven blends of the invention are preferably able to meet the demanding conditions of an array of industrial filtration applications, and in a preferred exemplary embodiments are able to meet the following physical testing requirements:

| | |
|---|---|
| Weight (osy) ASTM D-5261 | <20 osy |
| Air permeability (cfm @ 0.5" water) ASTM D-737-69 | 20-60 |
| Tensile Strength (lb.) (MD x CD) ASTM D-4632 | >150 x 100 |
| Mullen Burst ASTM D-3786 | >300 psi |
| MIT Flex Resistance ASTM D-2176-69 | >20,000 cycles |
| Hot Nut Spark Resistance @ 900° C. | No Ignition |
| Shrinkage @ 400° F. | <2% after 2 hrs. |
| Temperature Resistance (continuous/peak) ° F. | 464/500 |

According to one exemplary embodiment, the filter media may comprise a Mullen burst strength of greater than about 500 psi. According to a further exemplary embodiment, the filter media has hot nut spark resistance (no ignition) at or above 900° C. According to another exemplary embodiment, the filter media may comprise a continuous temperature resistance of about 450° F. or greater.

In alternative exemplary embodiments, the fabrics of the invention meet one or more of the following physical test conditions:

Weight—greater than 10, 11, 12, 13 or 14 osy, and less than 30, 25, 20, 18, 17, 16, or 15 osy.

Air permeability—greater than 15 or 20 cfm@0.5' water, and less than 80, 60, 50 or 40 cfm@0.5' water.

Pore Volume % (DIN 53855)—greater than about 60, 65 or 70%, and less than about 85, 80 or 75%.

Tensile strength (MD)—greater than about 100, 125 or 150, and less than about 250, 200 or 180.

Tensile strength (CD)—greater than about 60 or 80, and less than about 200, 150 or 125.

Hot nut spark resistance (no ignition)—greater than 500, 600, 700, 800, or 900° C.

Shrinkage at 400° F. after two hours—less than 5, 4, 3 or 2%, and greater than 0.2 or 0.5%.

Temperature Resistance (continuous)—greater than about 300, 325, 350, 375, 400, 425, 450, or 500° F.

Temperature Resistance (peak)—greater than about 300, 325, 350, 375, 400, 425, 450, or 500° F.

According to one exemplary embodiment, the filter media has a fabric weight of from about 12 to about 17 ounces per square yard (osy). According to another exemplary embodiment, the filter media has an air permeability (cfm@0.5' water) of from about 20 to about 40.

In a preferred exemplary embodiment, the temperature resistance is defined relative to the particular carrier fibers with which the silica fibers are bound into a fabric, as set forth in Table 6 below:

TABLE 6

| Carrier Fiber (50:50 blend of carrier fiber:silica fiber) | Temperature Resistance (continuous/peak) |
|---|---|
| Polypropylene(needlona ® PP/PP 554 C17 ®) | >100/105, 110/115 or 120/125° C. |
| Polyacrylnitrile copolymer (needlona ® AC/AC 501) | >125/130, 135/140 or 145/150° C. |
| Polyacrylnitrile homopolymer (needlona ® DT/DT 554 CS17 ®) | >140/150, 150/160 or 160/170° C. |
| Polyacrylnitrile homopolymer plus polyester(needlona ® DT-PE/DT-PE 551) | >135/150, 145/160 or 150/170° C. |
| Polyester (needlona ® PE/PE 524 PyroGuard) | >130/160, 140/170 or 150/180° C. |
| Polyester(needlona ® PE/PE 401; needlona ® PE/PE 554 CS17 ®; needlona ® PE/PE 554 glaze Si; needlona ® PE/PE 551 ExCharge ®; needlona ® PE/PE 611 MPS CS17 ®) | >160/160, 170/170 or 180/180° C. |
| m-Aramide(needlona ® NO/NO 551) | >205/225, 215/235 or 220/240° C. |
| Polyimide(needlona ® PI/PI 551 CS31) | >250/270, 255/275, or 260/280° C. |
| PTFE plus fiberglass (needlona ® PTFE/PTFE 712 MPS Vetro; needlona ® TFL/PTFE 712 MPS Vetro) | >260/290, 270/300 or 280/310° C. |
| PTFE (needlona ® TFL/PTFE 754 MPS CS18 ®; needlona ® VetroCore 100) | >260/290, 270/300 or 280/310° C. |
| Polyamide-imide (needlona ® AsphalTec LPC) | 180/200, 190/210 or 200/220° C. |

EXAMPLES

In order to demonstrate the efficacy of various fiber blends according to the invention, a number of samples were prepared and tested, as described hereinbelow. The examples have been provided to demonstrate practice of the present invention and should not be construed as limitation of the invention or its practice. A study was carried out to compare how filter fabrics containing 50/50 mixtures of the silica fiber and other high-temperature fibers and fabrics made of high temperature fibers alone would perform when exposed to a simulated flame on the fabric. The flame was simulated by placing a 12.7 mm diameter metal nut heated to 900° C. and allowing it to stay on the fabric for a period of 30 seconds. The time taken for the flame to self-extinguish was then recorded. Each test was replicated 3 times. The fabrics used in each case weighed approximately 16 oz/sq.yd. Unless specified otherwise all fabrics used in the tests were needled felts.

The individual data obtained from the test and the average values as well as the percentage reduction in flame extinction time achieved by blending with the silica fiber are shown on Table No. 7, which follows. By blending Silica fiber with Nomex or PPS fiber the flame extinction time can be reduced by more than 50% so that the blended fabrics perform as well as the more expensive P84 Fabric. The reduction in flame extinction time that can be achieved by blending Silica fiber with P84 fiber is marginal.

TABLE NO. 7

FABRIC BLENDS

| Fabric ID/Blend Percentage | Flame Extinction Time, seconds | Average Flame Extiction Time, Seconds | % Reduction over Fabric without Silica Fiber |
|---|---|---|---|
| PPS | 14.4 | 15.8 | 81 |
| PPS | 18 | | |
| PPS | 15 | | |
| 50-50 PPS-SILICA FIBER FIBER | 3.0 | 3.0 | |
| 50-50 PPS-SILICA FIBER FIBER | 3.0 | | |
| 50-50 PPS-SILICA FIBER FIBER | 3.0 | | |
| NOMEX | 13.2 | 14.0 | 54 |
| NOMEX | 15 | | |
| NOMEX | 13.8 | | |
| 50-50 NOMEX-SILICA FIBER | 7.8 | 6.4 | |
| 50-50 NOMEX-SILICA FIBER | 6 | | |
| 50-50 NOMEX-SILICA FIBER | 5.4 | | |
| P84 | 3 | 4.6 | 13 |
| P84 | 4.8 | | |
| P84 | 6 | | |
| 50-50 P84-SILICA FIBER | 4.2 | 4.0 | |
| 50-50 P84-SILICA FIBER | 3 | | |
| 50-50 P84-SILICA FIBER | 4.8 | | |

The data reported in Table No. 8 presents more comparative data for Silica fiber blended fabrics and commercial high-temperature baghouse filter fabrics having various chemical compositions. Clearly, the Silica fiber blended fabrics have the lowest flame extinction times: the Flame Extinction times vary from 4.0-6.4 seconds for the blends versus 9-27.4 for unblended commercial fabrics excluding P84 fabric. It should be noted that the E-Glass based fabrics used herein contained proprietary chemical coatings to improve chemical and/or abrasion resistance whereas all the Silica fiber based blend fabrics did not have any chemical coatings.

TABLE NO. 8

| FABRIC ID/BLEND PERCENTAGE | FIBER CHEMICAL COMPOSITION | FLAME EXTINCTION TIME, SECONDS | AVERAGE FLAME EXTINCTION TIME, SECONDS |
|---|---|---|---|
| PPS | POLYPHENYLENE | 14.4 | 15.8 |
| PPS | SULPHIDE | 18 | |
| PPS | | 15 | |
| P84 | AROMATIC POLYIMIDE | 3 | 4.6 |
| P84 | | 4.8 | |
| P84 | | 6 | |
| NOMEX | META-ARAMID | 13.2 | 14 |
| NOMEX | | 15 | |
| NOMEX | | 13.8 | |
| HUYGLAS | COATED 100% E-GLASS | 9.6 | 9.4 |
| HUYGLAS | | 10.2 | |
| HUYGLAS | | 8.4 | |
| CONEX | META-ARAMID | 23.4 | 27.4 |
| CONEX | | 28.8 | |
| CONEX | | 30 | |
| PANOTEX | POLYPHENYLENE | 22.8 | 21.2 |
| PANOTEX | SULPHIDE + CARBON | 21.6 | |
| PANOTEX | FIBER | 19.2 | |
| BGF WOVEN | COATED 100% E-GLASS | 9.6 | 9 |
| BGF WOVEN | | 8.4 | |
| BGF WOVEN | | 9 | |
| 50-50 NOMEX-SILICA FIBER | UNCOATED META-ARAMID + | 7.8 | 6.4 |
| 50-50 NOMEX-SILICA FIBER | SILICA FIBER | 6 | |
| 50-50 NOMEX-SILICA FIBER | | 5.4 | |
| 50-50 P84-SILICA FIBER | UNCOATED AROMATIC | 4.2 | 4 |
| 50-50 P84-SILICA FIBER | POLYIMIDE + SILICA | 3 | |
| 50-50 P84-SILICA FIBER | FIBER | 4.8 | |
| 50-50 PPS-SILICA FIBER | UNCOATED | 3 | 3 |
| 50-50 PPS-SILICA FIBER | POLYPHENYLENE | 3 | |
| 50-50 PPS-SILICA FIBER | SULPHIDE + SILICA FIBER | 3 | |

Thus, it should be evident that the use of amorphous silica fibers is highly effective in fabrics for hot gas filtration applications. The invention can be practiced by combining amorphous silica fibers with at least one other flame resistant fiber, or a binder fiber but is necessarily limited thereto. Nor, is practice limited to the selection of a particular FR fiber or binder fiber so long as the one or more selected are combined with amorphous silica fibers. Moreover, the fabrics are not limited to non-woven types.

Throughout this application, various publications are referenced. The disclosures of these publications in their entireties are hereby incorporated by reference into this application in order to more fully describe the state of the art to which this invention pertains. It will be apparent to those skilled in the art that various modifications and variations can be made in the invention without departing from the scope or spirit of the invention. Other exemplary embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A baghouse filter comprising a non-woven filter media including a blend of fibers, wherein the blend comprises amorphous silica fibers and at least one flame resistant (FR) fiber, wherein the amorphous silica fibers comprise a mixture of about 94 to about 96% by weight $SiO_2$, about 3 to about 4% by weight $Al_2O_3$, about 0.1 to about 1.0% by weight $Na_2O$, about 0.01 to about 1.0% by weight CoO, and about 0.01 to about 1.0% by weight $SO_3$ and wherein the at least one flame resistant fiber comprises an organic polymer fiber.

2. The non-woven filter media of claim 1, further comprising from about 5 to about 95 wt. % of amorphous silica fibers, and from about 5 to about 95 wt. % of one or more FR fibers wherein the amorphous silica fibers comprise a mixture of about 94 to about 96% by weight $SiO_2$, about 3 to about 4% by weight $Al_2O_3$, about 0.1 to about 1.0% by weight $Na_2O$, about 0.01 to about 1.0% by weight CoO, and about 0.01 to about 1.0% by weight $SO_3$.

3. The non-woven filter media of claim 1, further comprising two peripheral layers and an inner layer, wherein said inner layer comprises a scrim, and said peripheral layers comprises uniformly blended amorphous silica fibers and FR fibers wherein the amorphous silica fibers comprise a mixture of about 94 to about 96% by weight $SiO_2$, about 3 to about 4% by weight $Al_2O_3$, about 0.1 to about 1.0% by weight $Na_2O$, about 0.01 to about 1.0% by weight CoO, and about 0.01 to about 1.0% by weight $SO_3$.

4. The non-woven filter media of claim 1, further comprising from about 20 to about 80 wt. % of amorphous silica fibers, and from about 20 to about 80 wt. % of one or more FR fibers selected from modacrylics, polyester with phosphalane, melamines, meta aramids, para aramids, polybenzimidazole, polyimides, polyamideimides, partially oxidized polyacrylonitriles, novoloids, poly(p phenylene benzobisoxazoles), poly(p phenylenebenzothiazoles), polyphenylene sulfides, flame retardant viscose rayons; viscose rayon containing aluminosilicate-modified silica, cellulosics, polyetheretherketones, polyketones, polyetherimides, natural or synthetic fibers coated with an FR resin, or mixtures thereof.

5. The non-woven filter media of claim 1, wherein the blend comprises from about 5 to about 65 weight percent amorphous silica fibers and from about 35 to about 95 weight percent of one or more FR fibers wherein the amorphous silica fibers comprise a mixture of about 94 to about 96% by weight $SiO_2$, about 3 to about 4% by weight $Al_2O_3$, about 0.1 to about 1.0% by weight $Na_2O$, about 0.01 to about 1.0% by weight CoO, and about 0.01 to about 1.0% by weight $SO_3$.

6. The non-woven filter media of claim 1, comprising amorphous silica fibers and fibers comprising polyphenylene sulfide wherein the amorphous silica fibers comprise a mixture of about 94 to about 96% by weight $SiO_2$, about 3 to about 4% by weight $Al_2O_3$, about 0.1 to about 1.0% by weight $Na_2O$, about 0.01 to about 1.0% by weight CoO, and about 0.01 to about 1.0% by weight $SO_3$.

7. The non-woven filter media of claim 1, comprising amorphous silica fibers and fibers comprising an aromatic polyimide wherein the amorphous silica fibers comprise a mixture of about 94 to about 96% by weight $SiO_2$, about 3 to about 4% by weight $Al_2O_3$, about 0.1 to about 1.0% by weight $Na_2O$, about 0.01 to about 1.0% by weight CoO, and about 0.01 to about 1.0% by weight $SO_3$.

8. The non-woven filter media of claim 1, where said non-woven filter media is needle-punched.

9. The baghouse filter of claim 1, wherein said filter media has a fabric weight of from about 12 to about 17 osy.

10. The baghouse filter of claim 1, wherein said filter media has an air permeability (cfm@0.5" water) of from about 20 to about 40.

11. The baghouse filter of claim 1, wherein said filter media has a Mullen burst strength of greater than about 500 psi.

12. The baghouse filter of claim 1, wherein said filter media has hot nut spark resistance without any ignition at approximately 900.degree. C.

13. The baghouse filter of claim 1, wherein said filter media has a continuous temperature resistance of greater than about 450.degree. F.

* * * * *